(12) United States Patent
VanBlon et al.

(10) Patent No.: US 11,540,025 B2
(45) Date of Patent: Dec. 27, 2022

(54) VIDEO FEED ACCESS DETERMINATION

(71) Applicant: Lenovo (Singapore) Pte. Ltd., Singapore (SG)

(72) Inventors: Russell Speight VanBlon, Raleigh, NC (US); Nathan J. Peterson, Oxford, NC (US); Mark Patrick Delaney, Raleigh, NC (US); Arnold S. Weksler, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 357 days.

(21) Appl. No.: 16/832,831

(22) Filed: Mar. 27, 2020

(65) Prior Publication Data

US 2021/0306715 A1 Sep. 30, 2021

(51) Int. Cl.
*H04N 21/647* (2011.01)
*H04N 21/2187* (2011.01)
*G06F 16/783* (2019.01)
*G06F 21/62* (2013.01)
*H04L 9/40* (2022.01)

(52) U.S. Cl.
CPC ......... *H04N 21/647* (2013.01); *G06F 16/784* (2019.01); *G06F 21/6218* (2013.01); *H04L 63/102* (2013.01); *H04N 21/2187* (2013.01)

(58) Field of Classification Search
CPC ............. H04N 21/647; H04N 21/2541; H04N 21/2396; H04N 21/2187; H04L 63/10; H04L 63/102; G06F 21/6218; G06F 16/784
See application file for complete search history.

(56) References Cited

U.S. PATENT DOCUMENTS

| | | | | |
|---|---|---|---|---|
| 3,811,090 A * | 5/1974 | Uchida | ................. | H04N 5/63 348/730 |
| 4,331,977 A * | 5/1982 | Cohn | ................. | H04N 5/63 348/730 |
| 4,439,784 A * | 3/1984 | Furukawa | ......... | H04N 7/17363 725/38 |
| 5,475,364 A * | 12/1995 | Kenet | ................ | G08B 19/005 340/567 |
| 6,002,380 A * | 12/1999 | Lee | ................. | H04N 3/22 345/13 |
| 6,076,169 A * | 6/2000 | Lee | ................. | G06F 1/3215 713/320 |
| 6,205,318 B1 * | 3/2001 | Schindler | ......... | H04N 21/43615 348/E5.103 |
| 6,259,486 B1 * | 7/2001 | Mahvi | ................ | H04N 5/44 348/730 |

(Continued)

*Primary Examiner* — Michael B. Pierorazio
(74) *Attorney, Agent, or Firm* — Ference & Associates LLC

(57) ABSTRACT

One embodiment provides a method, including: receiving, at an information handling device, a request from a user to access a video feed; determining, using a processor, whether: an authorized association exists between the user and an object associated with the video feed; and a predetermined condition is satisfied; and granting, responsive to determining that the authorized associations exists and that the predetermined condition is satisfied, the user access to the video feed. Other aspects are described and claimed.

20 Claims, 3 Drawing Sheets

(56) References Cited

U.S. PATENT DOCUMENTS

| | | | | |
|---|---|---|---|---|
| 7,411,631 B1* | 8/2008 | Joshi | G06F 1/3203 | |
| | | | 348/730 | |
| 7,730,507 B2* | 6/2010 | Sakai | H04N 5/63 | |
| | | | 348/730 | |
| 8,004,616 B2* | 8/2011 | Kitamura | H04N 5/63 | |
| | | | 348/730 | |
| 8,266,666 B2* | 9/2012 | Friedman | H04N 21/42204 | |
| | | | 725/133 | |
| 9,485,459 B2* | 11/2016 | Shoemake | G06V 40/10 | |
| 10,419,235 B2* | 9/2019 | Lin | H04L 12/2803 | |
| 10,873,784 B2* | 12/2020 | Honjo | H04N 5/2254 | |
| 2005/0132420 A1* | 6/2005 | Howard | G06F 3/017 | |
| | | | 348/E5.103 | |
| 2005/0243081 A1* | 11/2005 | Cha | H02M 1/15 | |
| | | | 345/212 | |
| 2006/0140452 A1* | 6/2006 | Raynor | G06F 1/3203 | |
| | | | 382/115 | |
| 2007/0152994 A1* | 7/2007 | Koh | G09G 5/006 | |
| | | | 348/E5.127 | |
| 2009/0010671 A1* | 1/2009 | Hashimoto | G06F 1/3203 | |
| | | | 713/300 | |
| 2009/0021649 A1* | 1/2009 | Lee | H04N 5/63 | |
| | | | 348/730 | |
| 2009/0133051 A1* | 5/2009 | Hildreth | H04N 21/42204 | |
| | | | 725/28 | |
| 2009/0316796 A1* | 12/2009 | Taleb | H04N 21/4436 | |
| | | | 375/E7.027 | |
| 2010/0196038 A1* | 8/2010 | Yamaguchi | G03G 15/2039 | |
| | | | 399/69 | |
| 2010/0306558 A1* | 12/2010 | Kang | G06F 1/3203 | |
| | | | 713/300 | |
| 2011/0179300 A1* | 7/2011 | Suzuki | G11B 19/00 | |
| | | | 713/323 | |
| 2013/0322846 A1* | 12/2013 | Ferren | G06Q 30/0201 | |
| | | | 386/234 | |
| 2014/0123162 A1* | 5/2014 | Karlsson | H04N 21/44218 | |
| | | | 725/12 | |
| 2014/0210754 A1* | 7/2014 | Ryu | G06F 3/0346 | |
| | | | 345/173 | |
| 2014/0245041 A1* | 8/2014 | Ayalur | G06F 1/3206 | |
| | | | 713/323 | |
| 2014/0375752 A1* | 12/2014 | Shoemake | H04N 7/14 | |
| | | | 348/14.07 | |
| 2019/0387192 A1* | 12/2019 | Fang | H04N 21/4432 | |

* cited by examiner

VIDEO FEED ACCESS DETERMINATION

BACKGROUND

Security cameras ("cameras") are important components in many home security systems. Users frequently install one or more cameras in various places around their home, e.g., at their front door, in their driveway, in their backyard, in their living room, etc. Cameras may be programmed to continually record a scene or, alternatively, may only initiate recording when a predetermined event has occurred (e.g., when movement is detected by one or more sensors, etc.). In the case of the former, users may remotely access the video feed by using an application on an information handling device ("device"), for example, a laptop, a smart phone, a tablet, and the like.

BRIEF SUMMARY

In summary, one aspect provides a method, comprising: receiving, at an information handling device, a request from a user to access a video feed; determining, using a processor, whether: an authorized association exists between the user and an object associated with the video feed; and a predetermined condition is satisfied; and granting, responsive to determining that the authorized associations exists and that the predetermined condition is satisfied, the user access to the video feed.

Another aspect provides an information handling device, comprising: at least one sensor; a processor; receive a request from a user to access a video feed; determine whether: an authorized association exists between the user and an object associated with the video feed; and a predetermined condition is satisfied; and grant, responsive to determining that the authorized associations exists and that the predetermined condition is satisfied, the user access to the video feed.

A further aspect provides a product, comprising: a storage device that stores code, the code being executable by a processor and comprising: code that receives a request from a user to access a video feed; code that determines whether: an authorized association exists between the user and an object associated with the video feed; and a predetermined condition is satisfied; and code that grants, responsive to determining that the authorized associations exists and that the predetermined condition is satisfied, the user access to the video feed.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
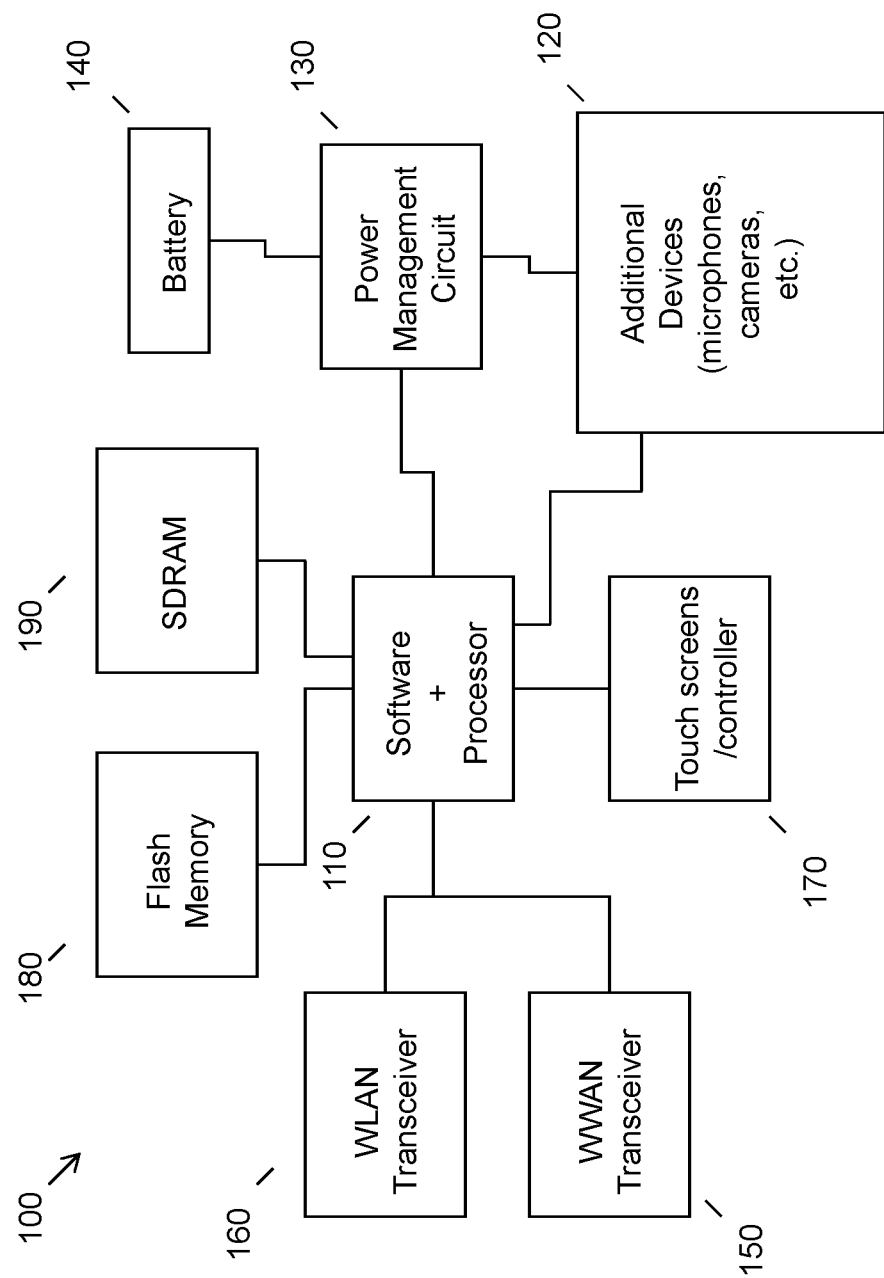
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Instances may arise where certain individuals may desire to access the video feed of a camera belonging to another individual (i.e., an "authorized individual"). For example, an authorized individual may be hosting a backyard birthday party for their child. A parent of an invited child may desire to view an available video feed of the backyard party in order to ensure that their invited child is safe, supervised, behaving appropriately, etc. Conventionally, the only way for another individual to obtain access to a video feed belonging to an authorized individual is to explicitly request the authorized individual for the video feed access information. Such a request may be awkward and burdensome to both the authorized individual and the requesting individual.

Accordingly, an embodiment provides a method for dynamically granting a user access to a video feed. In an embodiment, a request may be received from a user to access a video feed. An embodiment may then determine whether two factors are met. More particularly, an embodiment may determine whether an authorized association exists (e.g., a familial relationship, a supervisorial relationship, an ownership relationship, etc.) between the user and an object (e.g., a person, pet, inanimate object, etc.) associated with the video feed. Additionally, an embodiment may determine whether a predetermined condition is satisfied (e.g., the object is currently detected in the video feed, the object is in the same location where the video feed is being captured, the user is in the same location where the video feed is being captured, etc.). Responsive to determining that the two foregoing factors are met, an embodiment may grant the user access to the video feed. Such a method provides a more dynamic, but still secure, way of providing access to users requesting to view a video feed.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
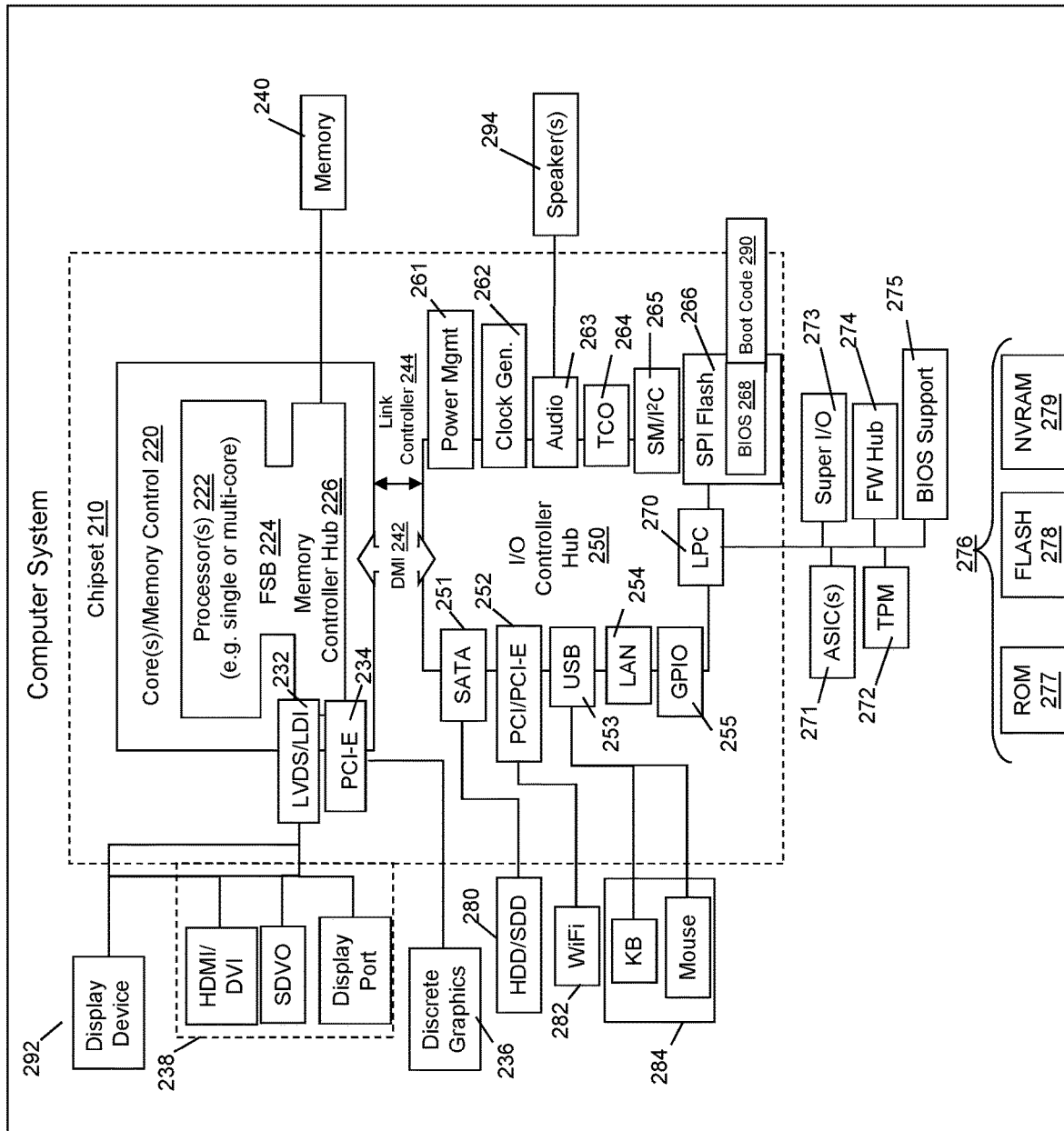
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that may be capable of accessing a video feed produced by one or more security cameras. For example, the circuitry outlined in FIG. 1 may be implemented in a smart phone or tablet embodiment, whereas the circuitry outlined in FIG. 2 may be implemented in a laptop.

Figure 3:
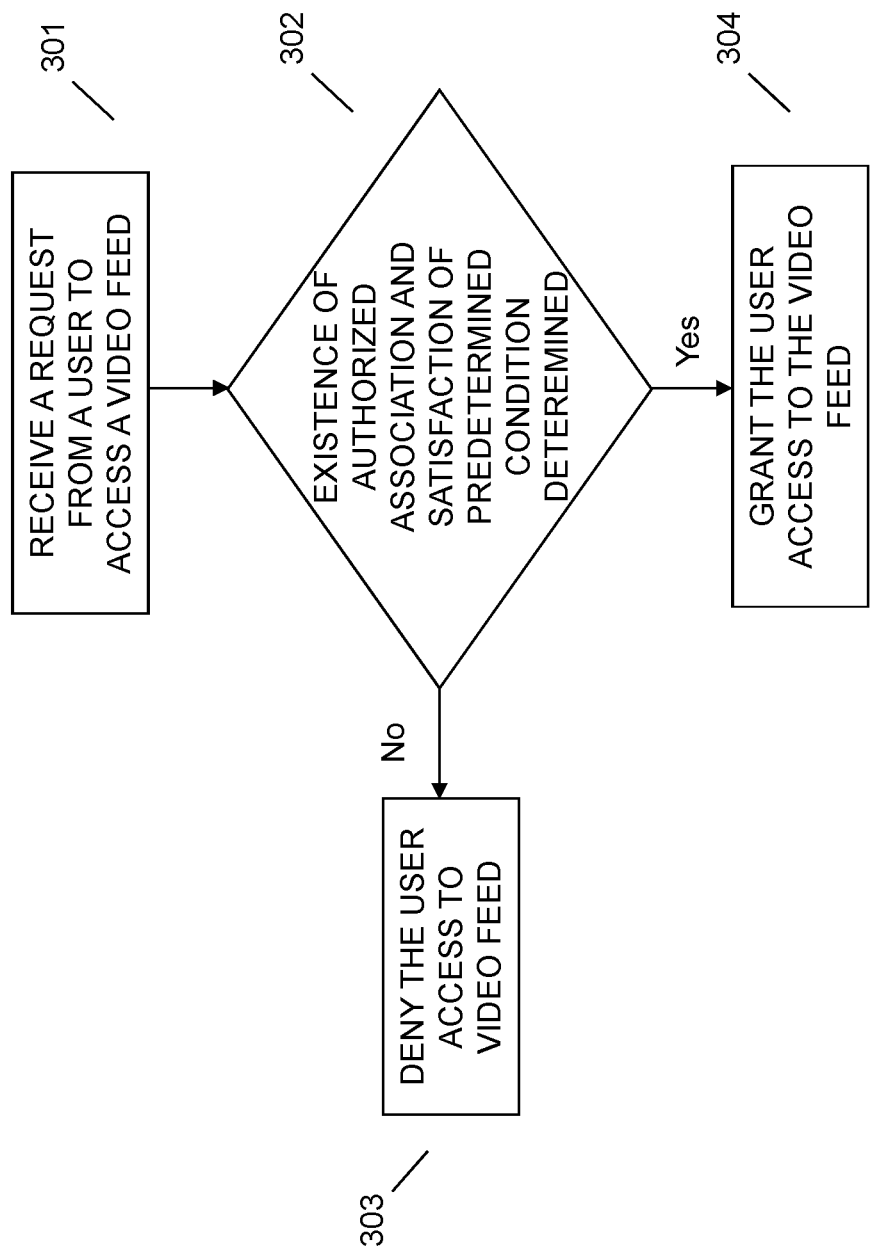
FIG. 3 illustrates an example method of granting a user access to view a video feed.

Referring now to FIG. 3, an embodiment provides a method for granting a user access to a video feed. At 301, an embodiment may receive a request from a user to access a video feed. In an embodiment, the request may be transmitted from a device associated with a requesting user ("requestor"). More particularly, the requestor may transmit the request via a video feed access application ("application") that is associated with and/or supports access to one or more video feeds generated by security cameras owned by an owning user ("owner"). The application may be similarly resident on a device associated with the owner that is connected to the aforementioned video feeds. For example, the owner's device may be: a central terminal located in the owner's home (e.g., a laptop or desktop, etc.), one or more remote devices managed by owners and/or associates of the application company, the security camera's themselves, and the like.

In an embodiment, the request for access may refer to either an explicit or implicit access request. Regarding the former, the requestor may explicitly provide a request to the application to access a particular video feed or to identify an object present, or likely to be present, in one of a plurality of video feeds (e.g., "provide me access to John's video feed", "provide me access to the video feed showing my child", etc.). Alternatively, regarding the latter, an implicit request for access may be transmitted substantially immediately when the requestor initiates/opens the application. For example, a requestor may adjust one or more settings resident in the application to immediately attempt to gain access to a particular video feed, or to attempt to identify the video feed in which a particular object (e.g., the requestor's child, etc.) is located or is likely to be located. Additional details regarding types of access requests are further discussed herein.

At 302, responsive to receiving the request, an embodiment may determine that two factors are present prior to granting the requestor access to the video feed. More particularly, an embodiment may determine whether: (i) an authorized association exists between the requestor and an object associated with the video feed; and (ii) a predetermined condition is satisfied.

In the context of this application, an authorized association may refer to an association between the requestor and an object that is known to a system of the embodiments. In an embodiment, the object may be one of a variety of different objects such as people (e.g., children, etc.), pets, inanimate objects (e.g., cars, keys, leather accessories, other personal belongings, etc.), and the like. Examples of authorized associations that may exist include: a familial relationship between the requestor and another individual (e.g., the requestor's child, etc.), a supervisorial relationship between the requestor and another individual, an ownership relationship between the requestor and an object (e.g., a requestor's pet, car, wallet, etc.), and the like. In an embodiment, the associations between requestors and objects may be stored in an accessible storage database (e.g., stored locally on the owner-associated device, stored on a server associated with the application, etc.) and may be periodically updated (e.g., explicitly by the owner, dynamically by the system, etc.).

An embodiment may determine that an authorized association exists by first determining the identity of the requestor and the identity of an object. Regarding the former, an embodiment may identify the requestor by utilizing data associated with the request. For example, an embodiment may receive an indication of the requestor's identity from: a user profile on the application that the request is received from, a device associated with the requestor that the request originates from, a location that the request originates from, a combination of two or more of the foregoing, and the like. Regarding the latter, an embodiment may identify the relevant object by first analyzing the video feed (e.g., using one or more conventional image and/or video analysis techniques, etc.) to identify a pool of independent objects. The objects considered in the pool may be dictated by the objects that are identified in the video feed at substantially the time the request is received or, alternatively, from the objects that made an appearance in the video feed dating back to a predetermined point (e.g., from the past 5 minutes, 30 minutes, 1 hour, etc.). An embodiment may then determine whether a known association exists between the identified requestor and any of the identified objects in the pool by, for example, accessing a database of known associations between identified requestors and objects. If a match is found in the database, an embodiment may conclude that an authorized association exists.

In the context of this application, a predetermined condition may refer to at least one condition that must be presently identified (e.g., by a system of the embodiments, etc.) prior to granting the requestor access to a particular video feed. A variety of different types of predetermined conditions may exist and the selection of the number and/or types of conditions may be dictated by the manufacturer/programmer of the system, by the owner, a combination thereof, etc. Described below are pluralities of examples of different types of predetermined conditions that may be utilized alone or in combination, in determining whether to grant a user access to a video feed. It is important to note that the subsequent examples described below are not exhaustive and that other types of predetermined conditions, not explicitly described in this application, may also be utilized.

In an embodiment, a predetermined condition may be satisfied when at least the object that the requestor has an authorized association with is determined to be in the video feed. For example, for a requestor who wants to check up on their child through the video feed, an embodiment may only grant the requestor access to the video feed as long as their child is identified to be present in the feed. When the requestor's child leaves a field of view of a relevant security camera (e.g., to go into another room, another location, etc.), then the requestor's access may be dynamically cut off.

In another embodiment, a predetermined condition may be satisfied when substantially only the object that the requestor has an authorized association with is determined to be in the video feed. For example, for a requestor who wants to check up on their child through the video feed, an embodiment may only grant the requestor access to the video feed as long as only their child is present in the video feed. When another child comes into the field of view of the security camera then the requestor's access may be dynamically cut off. Additionally or alternatively, an embodiment may maintain the requestor's access as long as only other non-human objects are present in the video feed with the requestor's child (e.g., cars, bags, pets, etc.).

In another embodiment, a predetermined condition may be satisfied when the object that the requestor has an authorized association with is determined to be in a location where the video feed is occurring. For example, for a requestor who wants to check up on their child through the video feed, an embodiment may only grant the requestor access to the video feed as long as the child is determined to be at the location where the video feed is generated (e.g., at a friend's house, etc.). When the child is concluded to no longer be in the location, the requestor's access may be dynamically cut off. In an embodiment, the object's location may be determined, or predicted, from one or more available location identification sources (e.g., global position system (GPS) data of a device associated with the object, wireless access point connection data of a device associated with the object, calendar data outlining the object's scheduled locations at different times throughout the day, communication and/or social media data, etc.). Similar to the foregoing, in another embodiment, a predetermined condition may be satisfied when the requestor is determined to be in the location where the video feed is captured. The requestor may have access to the video feed as long as they are determined to be in the video feed location. The requestor's position may be determined in much as the same way as the object's location, as described above.

Responsive to determining, at 302, that either an authorized association does not exist or that a predetermined condition is not satisfied, an embodiment may deny, at 303, the requestor access to a video feed. Conversely, responsive to determining, at 302, that an authorized association exists and that a predetermined condition is satisfied, an embodiment may, at 304, grant the requestor access to a particular video feed.

In an embodiment, a request for access to a video feed may correspond to a request for access to one of a plurality of available feeds. The determination of which video feed to provide the requestor access to may be contingent on the nature of the request. For example, a requestor may provide a general request to an application to view a video feed that contains their child. Assuming that a plurality of available video feeds is linked to the application (e.g., video feeds generated by security cameras from different homes in the requestor's neighborhood, etc.) and that the requestor has authorized access to view these video feeds, then an embodiment may first identify the video feed that contains the requestor's child and thereafter provide the requestor access to that feed. In such a situation, the requestor may utilize the power of multiple video feeds to locate an object that they may not know the precise location of.

In a similar embodiment to the foregoing, a requestor may gain access to one of a plurality of video feeds responsive to an embodiment detecting that an object associated with the requestor's location identification request was recently identified in a particular video feed. More particularly, although the object may no longer be present in any video feed, the requestor may be granted temporary access (e.g., for 2 minutes, for 5 minutes, etc.) to the video feed that the object was most recently detected in. Additionally or alternatively, each time certain objects (e.g., human objects, pet objects, etc.) are detected in any video feed, an embodiment may initiate a recording of those objects until they leave a field of the relevant security camera. These recordings may be stored for a predetermined period of time (e.g., a few hours, a day, a week, etc.) and may thereafter be provided to a requestor upon receipt of an object location identification request. Alternatively, an embodiment may not grant the user access to any video feed but instead may provide a notification to the requestor regarding the location of the video feed that the object was most recently detected in.

The various embodiments described herein thus represent a technical improvement to conventional methods of granting a user access to a video feed. In an embodiment, a request may be received from a requestor to access a video feed. Responsive to receiving this request, an embodiment may determine whether: (i) an authorized association exists between the user and an object associated with the video feed; and (ii) a predetermined condition is satisfied. The predetermined condition may correspond to one or more of a variety of different conditions. If the two aforementioned factors are met, then an embodiment may thereafter grant the user access to the video feed. Such a method may provide a more dynamic, but still secure, way of providing users access to certain video feeds.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:
1. A method, comprising:
  receiving, at an information handling device, a request from a requestor device of a user to access a video feed being captured at the information handling device;
  determining, using a processor, whether:

an authorized association exists between the user and an object associated with the video feed; and a predetermined condition is satisfied; and granting, from the information handling device to the requestor device, responsive to determining that the authorized associations exists and that the predetermined condition is satisfied, the user access to view the video feed captured by the information handling device upon the requestor device.

2. The method of claim 1, wherein the object is selected from the group consisting of a person, a pet, and an inanimate object.

3. The method of claim 1, wherein the authorized association is a relationship selected from the group consisting of a familial relationship, a supervisorial relationship, and an ownership relationship.

4. The method of claim 1, wherein the determining whether the authorized association exists comprises:

identifying an identity of the user and an identity of the object;

accessing a database of identity associations; and determining whether an association match exists in the database between the identity of the user and the identity of the object.

5. The method of claim 1, wherein the predetermined condition is satisfied when at least the object is determined to be in the video feed.

6. The method of claim 1, wherein the predetermined condition is satisfied when substantially only the object is determined to be in the video feed.

7. The method of claim 1, wherein the predetermined condition is satisfied when the object is determined to be in a location that the video feed is captured.

8. The method of claim 1, wherein the predetermined condition is satisfied when the user is determined to be in a location that the video feed is captured.

9. The method of claim 1, wherein the video feed is one of a plurality of video feeds and wherein:

the receiving the request comprises identifying in which of the plurality of video feeds the object is detected; and the granting comprises automatically granting the user access to the identified video feed where the object is detected.

10. The method of claim 1, wherein the video feed is one of a plurality of video feeds and wherein:

the receiving the request comprises receiving a command to identify in which of the plurality of video feeds the object was most recently detected in; and the granting comprises granting the user access to a recorded video clip from the identified video feed that the object was most recently detected in.

11. An information handling device, comprising:

at least one sensor;

a processor;

a memory device that stores instructions executable by the processor to:

receive a request from a requestor device of a user to access a video feed being captured at the information handling device;

determine whether:

an authorized association exists between the user and an object associated with the video feed; and a predetermined condition is satisfied; and grant, from the information handling device to the requestor device, responsive to determining that the authorized associations exists and that the predetermined condition is satisfied, the user access to view the video feed captured by the information handling device upon the requestor device.

12. The information handling device of claim 11, wherein the object is selected from the group consisting of a person, a pet, and an inanimate object.

13. The information handling device of claim 11, wherein the authorized association is a relationship selected from the group consisting of a familial relationship, a supervisorial relationship, and an ownership relationship.

14. The information handling device of claim 11, wherein the instructions executable by the processor to determine whether the authorized association exists comprise instructions executable by the processor to:

identify an identity of the user and an identity of the object;

access a database of identity associations; and determine whether an association match exists in the database between the identity of the user and the identity of the object.

15. The information handling device of claim 11, wherein the predetermined condition is satisfied when at least the object is determined to be in the video feed.

16. The information handling device of claim 11, wherein the predetermined condition is satisfied when substantially only the object is determined to be in the video feed.

17. The information handling device of claim 11, wherein the predetermined condition is satisfied when the object is determined to be in a location that the video feed is captured.

18. The information handling device of claim 11, wherein the predetermined condition is satisfied when the user is determined to be in a location that the video feed is captured.

19. The information handling device of claim 11, wherein the video feed is one of a plurality of video feeds and wherein:

the instructions executable by the processor to receive the request comprise instructions executable by the processor to identify in which of the plurality of video feeds the object is detected; and the instructions executable by the processor to grant comprise instructions executable by the processor to automatically grant the user access to the identified video feed where the object is detected.

20. A product, comprising:

a storage device that stores code, the code being executable by a processor and comprising:

code that receives a request from a requestor device of a user to access a video feed being captured at the information handling device;

code that determines whether:

an authorized association exists between the user and an object associated with the video feed; and a predetermined condition is satisfied; and code that grants, from the information handling device to the requestor device, responsive to determining that the authorized associations exists and that the predetermined condition is satisfied, the user access to view the video feed captured by the information handling device upon the requestor device.

* * * * *